W. LUCKHURST.
Weeding-Hoe.
No. 199,375. Patented Jan. 22, 1878.
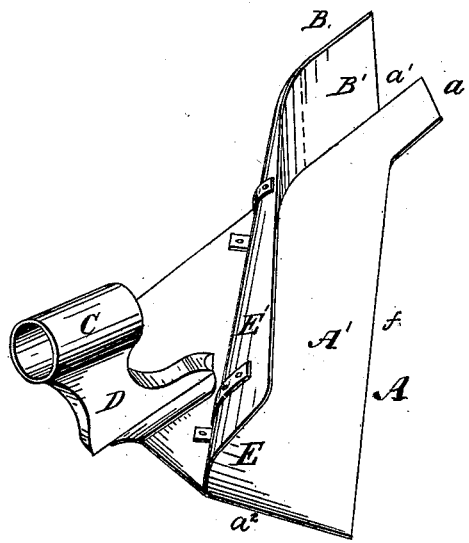
WITNESSES
INVENTOR
Walter Luckhurst
ATTORNEYS

UNITED STATES PATENT OFFICE.

WALTER LUCKHURST, OF WOODBRIDGE TOWNSHIP, MIDDLESEX COUNTY, NEW JERSEY, ASSIGNOR OF ONE-HALF HIS RIGHT TO CASSIMER W. BOYNTON, OF SAME PLACE.

IMPROVEMENT IN WEEDING-HOES.

Specification forming part of Letters Patent No. 199,375, dated January 22, 1878; application filed April 16, 1877.

*To all whom it may concern:*

Be it known that I, WALTER LUCKHURST, of the township of Woodbridge, county of Middlesex, and State of New Jersey, have invented a new and useful Improvement in Weeding-Hoes; and do hereby declare the following to be a full, clear, and exact description thereof, which will enable those skilled in the art to which the improvement applies to make and use the same, reference being had to the accompanying drawing, forming part of this specification.

In the drawing, A represents a weeding-hoe of the class known as "scuffle-hoes." It is a flat blade, having a point, $a$, with an extended receding edge, $f$, and having a flat upper face or surface, $A'$, extending back from the edge $f$, and has affixed on its rear end the shank D, with socket C for holding the handle. B is the clearing-blade and plate, consisting of a strip of metal of suitable width to serve as a guard and guide, for purposes hereinafter stated. Its end $B'$ is secured to the edge or side $a^1$ of the hoe A and slightly in rear of the point $a$, and acts as a cutter, to facilitate the movement of the hoe. It extends slightly back along the edge $a^1$, and is then gently curved and carried across the face $A'$, in front of the shank D, and has its end E flush with the opposite side $a^2$ of the blade A. It is arranged on a line parallel, or nearly parallel, with the receding edge $f$, and has its upper side curved forward and over, as shown at $E'$, and it is firmly secured in place by angle-irons or other suitable fastenings, as shown.

The weeds, &c., when cut by the point $a$ and edge $f$, fall onto the face $A'$, and are caught and carried off the hoe at the side $a^2$ by the plate B.

No dirt, nor weeds, nor other litter ever reaches the shank D. The grass, weeds, &c., are thrown off to one side, away from the uncut weeds, &c., so that the way is entirely cleared for the next cut by the hoe.

Having described my invention, what I claim, and desire to secure by Letters Patent, is—

In a weeding-hoe, the combination, with the flat blade A, of the clearing-blade B, having its end $B'$ secured to the edge or side $a^1$, while its other end, E, is curved forward, and is extended across and secured to the face $A'$ between the shank D and edge $f$, substantially as and for the purposes set forth.

WALTER LUCKHURST.

Witnesses:
 THOS. H. MORRIS,
 CASSIMER W. BOYNTON.